(12) United States Patent
Li

(10) Patent No.: US 9,369,463 B2
(45) Date of Patent: Jun. 14, 2016

(54) INFORMATION PROCESSING METHOD AND SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 14/779,310

(22) PCT Filed: Apr. 1, 2014

(86) PCT No.: PCT/CN2014/074519
§ 371 (c)(1),
(2) Date: Sep. 22, 2015

(87) PCT Pub. No.: WO2014/161468
PCT Pub. Date: Oct. 9, 2014

(65) Prior Publication Data
US 2016/0057125 A1 Feb. 25, 2016

(30) Foreign Application Priority Data

Apr. 3, 2013 (CN) .......................... 2013 1 0114473

(51) Int. Cl.
| H04L 9/32 | (2006.01) |
| H04L 29/06 | (2006.01) |
| G06F 21/31 | (2013.01) |

(52) U.S. Cl.
CPC .............. H04L 63/083 (2013.01); G06F 21/31 (2013.01); H04L 9/3226 (2013.01); H04L 29/06 (2013.01);
(Continued)

(58) Field of Classification Search
CPC . H04L 63/083; H04L 63/0853; H04L 63/123; H04L 63/08; G06F 21/31
See application file for complete search history.

(56) References Cited

U.S. PATENT DOCUMENTS

| 2007/0241182 A1* | 10/2007 | Buer ................... G06Q 20/341 235/380 |
| 2011/0119750 A1* | 5/2011 | Lu .......................... H04L 63/00 726/12 |

(Continued)

FOREIGN PATENT DOCUMENTS

| CN | 101840550 | 9/2010 |
| CN | 102195932 | 9/2011 |
| CN | 103220281 | 7/2013 |

OTHER PUBLICATIONS

Anol Bhattacherjee, "An emprirical analysis of the antecedents of electronic commerce service continuance," Decision Support Systems 32 (2001), pp. 201-214.*

(Continued)

Primary Examiner — Luu Pham
Assistant Examiner — Canh Le
(74) Attorney, Agent, or Firm — Hodgson Russ LLP

(57) ABSTRACT

Disclosed are an information processing method and system. The first terminal sends operation request information to an electronic signature token. The electronic signature token generates a joint password and a signature message, adjusts the joint password to obtain a first processing password, and sends the signature message and the first processing password to the first terminal. The first terminal notifies a first verification device to verify the signature message, and if the verification is successful, the first verification device notifies a background system server to preprocess the operation request information for obtaining preprocessed information. The electronic signature token outputs prompt information. A second terminal obtains the joint password according to the prompt information and notifies a second verification device to verify the joint password, and if the verification is successful, the second verification device triggers the background system server to perform a response process of the operation request information.

20 Claims, 2 Drawing Sheets

(52) U.S. Cl.
CPC ............ *H04L 63/08* (2013.01); *H04L 63/0853* (2013.01); *H04L 63/12* (2013.01); *H04L 63/123* (2013.01)

(56) References Cited

U.S. PATENT DOCUMENTS

| | | | | |
|---|---|---|---|---|
| 2013/0226799 A1* | 8/2013 | Raj | ........................ | G07C 9/00 705/44 |
| 2013/0226800 A1* | 8/2013 | Patel | .................. | G06Q 20/3224 705/44 |

OTHER PUBLICATIONS

Aphrodite et al. "Business models and transaction in mobile electronic commerce: requirement and properties," Computer Networks 37 (2001), pp. 221-236.*

Feng Wei et al., A Method and system for achieving identification authentication of network on the basis of two segregating units, Sep. 21, 2011, pp. 1-9.*

* cited by examiner

INFORMATION PROCESSING METHOD AND SYSTEM

CROSS-REFERENCE TO RELATED APPLICATION

This application is a U.S. national phase application of International Application No. PCT/CN2014/074519, filed on Apr. 1, 2014, which is based upon and claims priority to Chinese Patent Application No. 201310114473.X, filed on Apr. 3, 2013, the entirety contents of which are incorporated herein by reference.

FIELD

The present disclosure generally relates to an electronic technology field, and more particularly to an information processing method and system.

BACKGROUND

Nowadays, more and more people use internet to shop. However, there are certain risks during an online shopping, such as, an account and a password adopted during an online trading may be stolen easily, which brings an economy loss for users. Thus, there is a need to further improve a security of the online shopping.

During the conventional online trading, for a buyer, if he/she logs in a fraudulent website, payment will be putted into an account of the fraudulent website before receiving goods, resulting in economy loss for the buyer; for a seller, when the buyer performs an online trading with cash on delivery, the buyer may refuse to pay after receiving the goods or the buyer may refuse to pay if the goods is falsely claimed by others, resulting in economy loss for the seller. Therefore, a security of a trading process between the seller and the buyer cannot be ensured during the conventional online trading.

SUMMARY

Embodiments of the present disclosure seek to solve problems of a poor information security of both sides of a network interaction in the related art.

An information processing method includes: detecting by a first terminal an operation request, and sending by the first terminal operation request information to an electronic signature token; receiving by the electronic signature token the operation request information output from the first terminal, storing by the electronic signature token the operation request information, generating by the electronic signature token a joint password according to a password generation strategy pre-stored locally, generating by the electronic signature token a signature message according to the operation request information and the joint password, adjusting by the electronic signature token a content of the joint password according to a pre-stored joint password adjustment strategy to obtain an adjusted joint password, using by the electronic signature token the adjusted joint password as a first processing password, and sending by the electronic signature token the first processing password and the signature message to the first terminal; receiving by the first terminal the first processing password and the signature message, notifying a first verification device by the first terminal to verify the signature message according to the first processing password and the operation request information; notifying a background system server by the first verification device to preprocess the operation request information if the signature message passes verification; preprocessing by the background system server the operation request information according to a preset preprocessing strategy to obtain preprocessed information; outputting by the electronic signature token prompt information about the joint password; obtaining by a second terminal the joint password according to the prompt information, and using by the second terminal the joint password as a password to be verified; notifying a second verification device by the second terminal to verify the password to be verified; triggering the background system server by the second verification device to perform a response process of the operation request information according to the preprocessed information if the password to be verified passes verification.

In addition, generating a signature message according to the operation request information and the joint password includes: obtaining by the electronic signature token a content adjustment strategy of the operation request information, and processing by the electronic signature token a content of the operation request information according to the content adjustment strategy of the operation request information to obtain adjusted operation request information; and/or obtaining a content adjustment strategy of the joint password, adjusting the content of the joint password according to the content adjustment strategy of the joint password to obtain an adjusted joint password, and using the adjusted joint password as a second processing password; obtaining the signature message by signing any one of following combinations: the adjusted operation request information and the joint password; the operation request information and the second processing password; the adjusted operation request information and the second processing password.

In addition, the method further includes: notifying the first terminal the content adjustment strategy used for adjusting the operation request information; or notifying the first terminal the content adjustment strategy used for the second processing password; or notifying the first terminal the content adjustment strategy used for adjusting the operation request information and the content adjustment strategy used for the second processing password.

In addition, notifying a first verification device by the first terminal to verify the signature message according to the first processing password and the operation request information further includes: notifying the first verification device by the first terminal the content adjustment strategy used for adjusting the operation request information; or notifying the first verification device by the first terminal the content adjustment strategy used for the second processing password; or notifying the first verification device by the first terminal the content adjustment strategy used for adjusting the operation request information and the content adjustment strategy used for the second processing password.

In addition, processing a content of the operation request information according to the content adjustment strategy of the operation request information to obtain adjusted operation request information includes:

if the content adjustment strategy of the operation request information is encrypting the operation request information, then obtaining an encryption algorithm corresponding to the operation request information according to a pre-stored encryption algorithm allocation strategy, encrypting the operation request information according to the encryption algorithm to obtain an encrypted operation request information, and using the encrypted operation request information as the adjusted operation request information.

In addition, the first processing password and/or the second processing password is obtained by any of following ways:

if the content adjustment strategy of the joint password is encrypting the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the first processing password and/or the second processing password;

if the content adjustment strategy of the joint password is adding a random number to the joint password, then obtaining the random number according to a preset random number generation strategy, obtaining a random number combination strategy corresponding to the joint password according to preset random number combination strategies, processing the joint password according to the random number and the random number combination strategy to obtain a processed joint password, outputting the processed joint password as the first processing password and/or the second processing password, and notifying the first terminal the random number and the random number combination strategy used for the first processing password and/or the second processing password;

if the content adjustment strategy of the joint password is adding a random number to the joint password and encrypting the joint password added with the random number, then obtaining the random number according to a preset random number generation strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm, outputting the joint password processed by adding the random number and encrypting as the first processing password and/or the second processing password, and notifying the first terminal the random number and the random number combination strategy used for the first processing password and/or the second processing password;

if the content adjustment strategy of the joint password is encrypting the joint password and adding a random number to an encrypted joint password, then obtaining an encryption algorithm corresponding to the joint password according to a pre-stored encryption algorithm allocation strategy, encrypting the joint password according to the encryption algorithm to obtain an encrypted joint password, obtaining the random number according to a preset random number generation strategy, obtaining a random number combination strategy corresponding to the encrypted joint password according to preset random number combination strategies, processing the encrypted joint password according to the random number and the random number combination strategy, outputting the joint password processed by encrypting and adding the random number as the first processing password and/or the second processing password, and notifying the first terminal the random number and the random number combination strategy used for the first processing password and/or the second processing password.

In addition, before outputting by the electronic signature token prompt information about the joint password, the method further includes: verifying an identity of a requester requesting for outputting the joint password according to a preset identity verification strategy; outputting the joint password if the verification is successful.

In addition, the password to be verified is obtained in any of following ways: detecting information input via an input device of the second terminal, and obtaining the password to be verified according to a detection result; scanning barcode information or graphic information of the joint password displayed on a display screen of the electronic signature token to obtain the password to be verified; establishing a contactless communication connection with the electronic signature token, and receiving the joint password sent by the electronic signature token via the contactless communication connection, in which the joint password received is used as the password to be verified.

An information processing system includes a first terminal, an electronic signature token, a first verification device, a background system server, a second terminal and a second verification device, in which the first terminal includes a first sending module and a first notifying module, the electronic signature token includes a storage module, a first generating module, a second generating module, an adjusting module, a second sending module and an outputting module, the background system server includes a preprocessing module, the first verification device includes a second notifying module, the second terminal includes an obtaining module and a third notifying module, the second verification device includes a triggering module, the first sending module is configured to send operation request information to the electronic signature token after detecting an operation request, the storage module is configured to store the operation request information after receiving the operation request information output from the first terminal; the first generating module is connected with the storage module and configured to generate a joint password according to a password generation strategy pre-stored locally; the second generating module is connected with the first generating module and configured to generate a signature message according to the operation request information and the joint password after obtaining the joint password; the adjusting module is connected with the first generating module and configured to adjust a content of the joint password according to a joint password adjustment strategy pre-stored to obtain an adjusted joint password, and to use the adjusted joint password as a first processing password; the second sending module is connected with the second generating module and the adjusting module respectively and configured to send the first processing password together with the signature message to the first terminal; the first notifying module is connected with the second sending module and configured to notify the first verification device to verify the signature message according to the first processing password and the operation request information after receiving the first processing password and the signature message; the second notifying module is connected with the first notifying module and configured to notify the background system server to preprocess the operation request information if the signature message passes verification; the preprocessing module is connected with the second notifying module and is configured to preprocess the operation request information according to a preset preprocessing strategy to obtain preprocessed information; the outputting module is configured to output prompt information of the joint password; the obtaining module is configured to obtain the joint password according to the prompt message and to use the joint password as a password to be verified; the third notifying module is connected with the obtaining module and configured to notify the second verification device to verify the password to be verified; the triggering module is connected with the third notifying module and configured to trigger the background system server to perform a response process of the operation request information according to the preprocessed information if the password to be verified passes verification.

In addition, the second generating module includes a generating sub-module and at least one of a first processing sub-module and a second processing sub-module. The first processing sub-module includes: a first obtaining unit, configured to obtain a content adjustment strategy of the operation request information; a first processing unit, configured to process a content of the operation request information according to the content adjustment strategy of the operation request information to obtain adjusted operation request information. The second processing sub-module includes: a second obtaining unit, configured to obtain a content adjustment strategy of the joint password; a second processing unit, configured to adjust the content of the joint password according to the content adjustment strategy of the joint password to obtain an adjusted joint password, and to use the adjusted joint password as a second processing password. The generating sub-module is configured to obtain the signature message by signing any one of following combinations: the adjusted operation request information and the joint password; the operation request information and the second processing password; the adjusted operation request information and the second processing password.

In addition, the second generating module further includes a notifying sub-module, and the notifying sub-module is configured to notify the first terminal the content adjustment strategy used for adjusting the operation request information; or notify the first terminal the content adjustment strategy used for the second processing password; or notify the first terminal the content adjustment strategy used for adjusting the operation request information and the content adjustment strategy used for the second processing password.

In addition, the first terminal further includes a fourth notifying module, and the fourth notifying module is connected with the first notifying module and configured to notify the first verification device the content adjustment strategy used for adjusting the operation request information; or notify the first verification device the content adjustment strategy used for the second processing password; or notify the first verification device the content adjustment strategy used for adjusting the operation request information and the content adjustment strategy used for the second processing password.

In addition, the first processing sub-module is configured to obtain an encryption algorithm corresponding to the operation request information according to a pre-stored encryption algorithm allocation strategy, to encrypt the operation request information according to the encryption algorithm to obtain an encrypted operation request information, and to use the encrypted operation request information as the adjusted operation request information, if the content adjustment strategy of the operation request information is encrypting the operation request information.

In addition, the adjusting module is configured to obtain the first processing password and/or the second processing sub-module is configured to obtain the second processing password in any of following ways:

if the content adjustment strategy of the joint password is encrypting the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the first processing password and/or the second processing password;

if the content adjustment strategy of the joint password is adding a random number to the joint password, then obtaining the random number according to a preset random number generation strategy, obtaining a random number combination strategy corresponding to the joint password according to preset random number combination strategies, processing the joint password according to the random number and the random number combination strategy to obtain a processed joint password, outputting the processed joint password as the first processing password and/or the second processing password, and notifying the first terminal the random number and the random number combination strategy used for the first processing password and/or the second processing password;

if the content adjustment strategy of the joint password is adding a random number to the joint password and encrypting the joint password added with the random number, then obtaining the random number according to a preset random number generation strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm, outputting the joint password processed by adding the random number and encrypting as the first processing password and/or the second processing password, and notifying the first terminal the random number and the random number combination strategy used for the first processing password and/or the second processing password;

if the content adjustment strategy of the joint password is encrypting the joint password and adding a random number to an encrypted joint password, then obtaining an encryption algorithm corresponding to the joint password according to a pre-stored encryption algorithm allocation strategy, encrypting the joint password according to the encryption algorithm to obtain an encrypted joint password, obtaining the random number according to a preset random number generation strategy, obtaining a random number combination strategy corresponding to the encrypted joint password according to preset random number combination strategies, processing the encrypted joint password according to the random number and the random number combination strategy, outputting the joint password processed by encrypting and adding the random number as the first processing password and/or the second processing password, and notifying the first terminal the random number and the random number combination strategy used for the first processing password and/or the second processing password.

In addition, the outputting module includes: a verification unit, configured to verify an identity of a requester requesting for outputting the joint password according to a preset identity verification strategy; an outputting unit, configured to output the joint password if the verification is successful.

In addition, the obtaining module is configured to obtain the password to be verified by any one of following ways: detecting information input via an input device of the second terminal, and obtaining the password to be verified according to a detection result; scanning barcode information or graphic information of the joint password displayed on a display screen of the electronic signature token to obtain the password to be verified; establishing a contactless communication connection with the electronic signature token, receiving the joint password sent by the electronic signature token via the contactless communication connection, in which the joint password received is used as the password to be verified.

In addition, the first verification device is built into the first terminal or the background system server, and/or the second verification device is built into the second terminal or the background system server.

In addition, the electronic signature token is a smartcard or an electronic signature token having a signature function.

It may be seen from the above described technical solutions provided by the present disclosure that, with the information processing method and system provided by the present disclosure, by obtaining the joint password by the second terminal for completing a trading, the joint password may be transmitted in a form of plaintext, and account information of a user may not be leaked out even if the joint password is transmitted in the form of plaintext, thus ensuring a security of the account information of the user and improving a security of the trading. Moreover, by performing a signature according to the operation request information and the joint password, a non-repudiation of the trading is ensured and the security of the trading is further improved.

In addition, the operation request information is preprocessed, thus ensuring that the user cannot retract or cancel the operation request information. The operation request information is preprocessed when the joint password passes the verification, thus ensuring a security of a party interacting with the user. The operation corresponding to the operation request information is performed only when the joint password passes the verification, thus ensuring a security of the user. Especially in the online trading system, a part of money of the user is frozen by preprocessing, and the frozen money is paid to the seller when the trading is confirmed, thus ensuring the security of the seller. Further, the frozen money may be paid to the seller only when the trading is confirmed and the buyer inputs the correct joint password, thus ensuring a security of money of the buyer. Meanwhile, the goods are not provided to the buyer if the buyer inputs the incorrect joint password when confirming the trading, thus ensuring the security of the seller. Therefore, by performing the order operation and the trading confirmation operation (performed when the trading is completed, for example, when the goods are received) in two different terminals, a security of the online trading can be ensured.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

Figure 1:
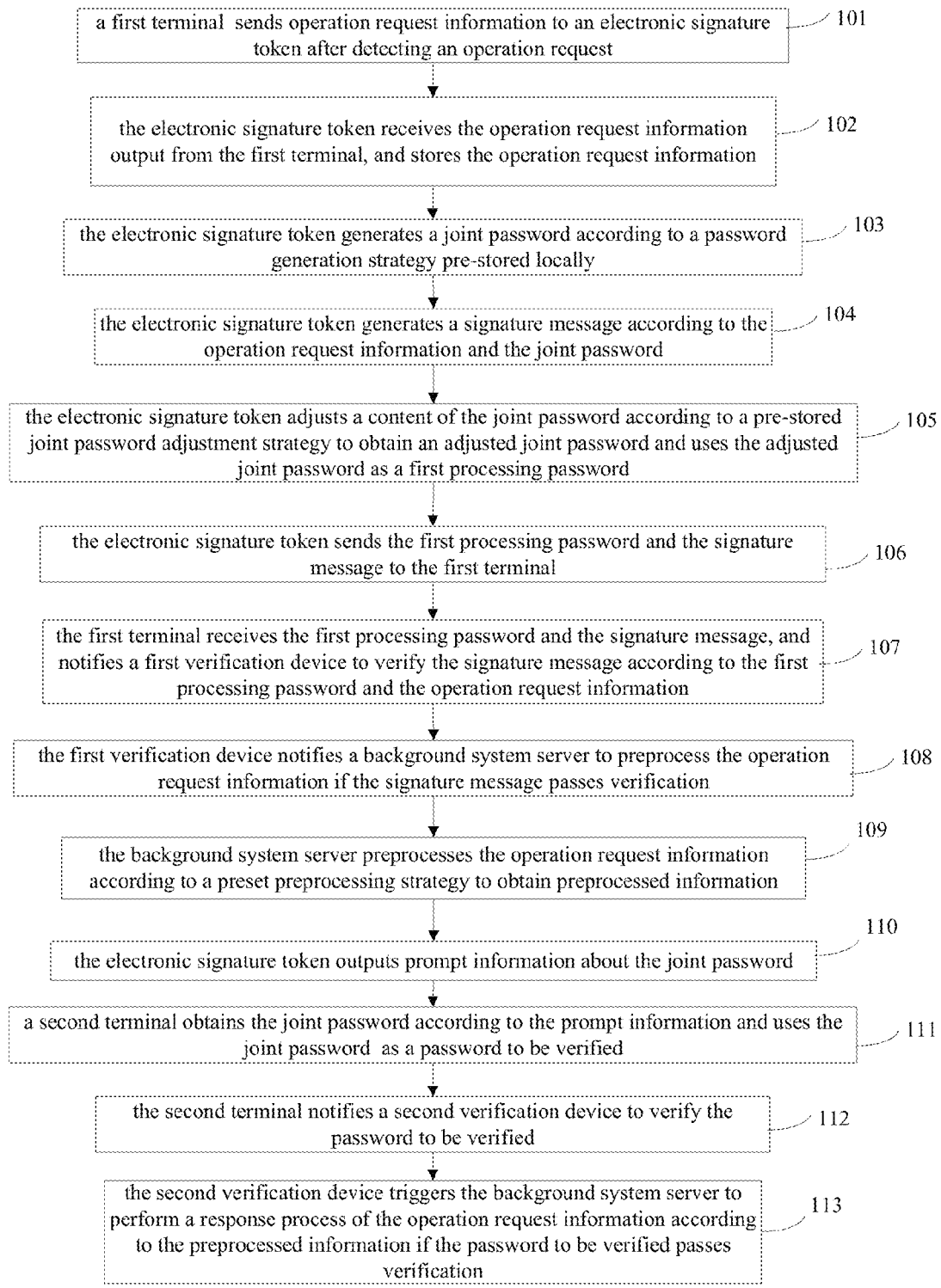
FIG. 1 is a flow chart of an information processing method according to an embodiment of the present disclosure.

The technique solution in embodiments of the present disclosure will be described in the following with reference to drawings in the embodiments of the present disclosure. Obviously, the embodiments to be described only are some embodiments of the present disclosure, instead of all the embodiments thereof. Based on embodiments of the present disclosure, other embodiments obtained by those having ordinary skills in the related art without making creative labors fall into a protection scope of the present disclosure.

In the description of the present disclosure, it is to be understood that relative terms such as "central", "longitudinal", "lateral", "up", "down", "front", "rear", "right", "left", "vertical", "horizontal", "bottom", "top", "inner", "outer" as well as derivative thereof should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation, and thus embodiments of the present disclosure are not limited to these. In addition, terms such as "first" and "second" are used herein for purposes of description and are not intended to indicate or imply relative importance or significance.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

Embodiments of the present disclosure will be further described in the following with reference to the drawings.

FIG. 1 is a flow chart of an information processing method according to an embodiment of the present disclosure. The method shown in FIG. 1 includes following steps.

In step 101, a first terminal sends operation request information to an electronic signature token after detecting an operation request.

In step 102, the electronic signature token receives the operation request information output from the first terminal, and stores the operation request information.

In step 103, the electronic signature token generates a joint password according to a password generation strategy pre-stored locally.

In step 104, the electronic signature token generates a signature message according to the operation request information and the joint password after obtaining the joint password.

In step 105, the electronic signature token adjusts a content of the joint password according to a pre-stored joint password adjustment strategy to obtain an adjusted joint password and uses the adjusted joint password as a first processing password.

In step 106, the electronic signature token sends the first processing password together with the signature message to the first terminal.

In step 107, the first terminal receives the first processing password and the signature message, and notifies a first verification device to verify the signature message according to the first processing password and the operation request information.

In step 108, the first verification device notifies a background system server to preprocess the operation request information if the signature message passes verification.

In step 109, the background system server preprocesses the operation request information according to a preset preprocessing strategy to obtain preprocessed information.

In step 110, the electronic signature token outputs prompt information about the joint password.

In step 111, a second terminal obtains the joint password according to the prompt information and uses the joint password as a password to be verified.

In step 112, the second terminal notifies a second verification device to verify the password to be verified.

In step 113, the second verification device triggers the background system server to perform a response process of the operation request information according to the preprocessed information if the password to be verified passes verification.

Compared with the existing technology, with method embodiments provided by the present disclosure, by obtaining the joint password by the second terminal for completing a trading, the joint password may be transmitted in a form of plaintext, and account information of a user may not be leaked out even if the joint password is transmitted in the form of plaintext, thus ensuring a security of the account information of the user and improving a security of the trading. Moreover, by performing a signature according to the operation request information and the joint password, a non-repudiation of the trading is ensured and the security of the trading is further improved.

In the following, the information processing method provided by the present disclosure will be further described.

In step A01, the first terminal sends the operation request information to the electronic signature token after detecting the operation request.

For example, the operation request is transferring a certain amount of deposit to a certain account. Then, the operation request information may include an account and an amount, and also may include trading detail information, etc.

The first terminal may be a fixed terminal or a mobile terminal. The fixed terminal may include ATMs (Automatic Teller Machines), PCs (Personal Computers), or POS (Point Of Sale) machines, etc. The mobile terminal may include mobile phones, tablet PCs, or handheld POS machines, etc.

The electronic signature token may be a smartcard or any other electronic signature token having a signature function, such as USB keys, second generation UKEYs, second generation U-shields, etc. The smartcard may include a card chip containing account information of the user and a security chip performing a digital signature by using a key, or include an integrated chip having functions of the two above-mentioned chips.

The first terminal may detect the operation request of the user via manual input or internet, and then sends the operation request information to the electronic signature token in a contactless way. Of course, the smartcard may be connected to the first terminal in a contact way, for example, via a USB interface or an audio interface. The smartcard is preferably connected to the terminal in the contactless way, which has a higher security and may prevent information from being intercepted when compared with connecting the smartcard to the terminal in the contact way.

In step A02, the electronic signature token stores the operation request information after receiving the operating request information output from the first terminal.

In step A03, the electronic signature token generates the joint password according to the password generation strategy pre-stored locally.

The password generation strategy may be pre-stored, or may be updated periodically. The latter may reduce a risk of breaking the password generation rules.

Of course, the password generation strategy may include password generation algorithms and input parameters, in which there may be various password generation algorithms, and the input parameters may be some real-time information used as input parameters required by generating the joint password, such as time information or random numbers, thus ensuring a diversity of the generation of the joint password.

In addition, the password generation strategy may be random generation strategy. For example, the smartcard generates numbers, letters and/or symbols randomly, and then selects one or more combination from the numbers, letters and/or symbols to generate the joint password, thus ensuring a non-uniqueness and a randomness of the joint password and improving a security of the joint password.

Specifically, the smartcard may generate the joint password using the method for generating the random number, thus ensuring the non-uniqueness and the randomness of the joint password and improving the security of the joint password.

Of course, the smartcard may generate the numbers, letters and/or symbols randomly and combine them optionally to generate the joint password.

The smartcard may convert the joint password to a barcode or a two-dimensional code, so as to facilitate subsequent access.

In the present disclosure, the joint password is generated in the smartcard side and then uploaded to a server, which is different from the OTP (One Time Password) generated in the server and the terminal simultaneously. In the present disclosure, the joint password is generated and signed in a single side, thus ensuring a security of transmitting the joint password and an accuracy of verifying the joint password.

In step A04, the electronic signature token generates the signature message according to the operation request information and the joint password after obtaining the joint password.

In practice, the signature message may be generated directly without processing both the operation request information and the joint password. However, in order to improve a security of the signature message, the operation request information and the joint password may be processed before generating the signature message.

The electronic signature token may generate the signature message in the following way.

First, the electronic signature token obtains a content adjustment strategy of the operation request information, and processes a content of the operation request information according to the content adjustment strategy of the operation request information to obtain adjusted operation request information; and/or the electronic signature token obtains a content adjustment strategy of the joint password, adjusts the content of the joint password according to the content adjustment strategy of the joint password to obtain an adjusted joint password, and uses the adjusted joint password as a second processing password.

Then, the electronic signature token obtains the signature message by signing any one of following combinations:

the adjusted operation request information and the joint password;

the operation request information and the second processing password;

the adjusted operation request information and the second processing password.

Preferably, the adjusted operation request information may be obtained in the following way.

If the content adjustment strategy of the operation request information is encrypting the operation request information, then an encryption algorithm corresponding to the operation request information is obtained according to a pre-stored encryption algorithm allocation strategy, the operation request information is encrypted according to the encryption algorithm to obtain an encrypted operation request information, and the encrypted operation request information is used as the adjusted operation request information.

The operation request information may be encrypted using a reversible encryption algorithm, or a nonreversible encryption algorithm. For example, a digest value calculation may be performed on the operation request information, in which the digest value calculation may include one or a combination of calculating a hash value by a hashing algorithm, calculating a MAC value by a MAC algorithm, and obtaining a ciphertext by a symmetric encryption.

By signing the operation request information and sending the signature message to the verification device, a truth of the operation request and a non-repudiation of the interaction result between the terminal and the electronic signature token may be ensured. For example, in the financial trading system, it may ensure that the trading is a real trading and the trading cannot be denied.

The generation of the second processing password and the generation of the first processing password will be described below.

It should be noted that, the first terminal may negotiate about the strategy used in generating the signature message and the strategy used in generating the first processing password with the electronic signature token in advance, thus reducing a number of information interactions between the first terminal and the electronic signature token.

If the first terminal does not negotiate about the above strategies with the electronic signature token in advance, the electronic signature token may notify the first terminal of the content adjustment strategy used for adjusting the operation request information in the first combination, or notify the first terminal of the content adjustment strategy used for the second processing password in the second combination, or notify the first terminal of the content adjustment strategy used for adjusting the operation request information and the content adjustment strategy used for the second processing password in the third combination.

In practice, different strategies may be used in each time. Thus, by notifying the first terminal of the content adjustment strategy, it may ensure that the first terminal may obtain the content adjustment strategy used in this time and trigger a process of verifying the signature message. Moreover, since the strategy is selected with a high randomness, a risk of breaking the strategy is reduced.

In step A05, the electronic signature token adjusts the content of the joint password according to the pre-stored joint password adjustment strategy to obtain the adjusted joint password, and uses the adjusted joint password as the first processing password.

The first processing password and the second processing password in step A04 and step A05 are obtained according to any one of following ways.

Way One: if the content adjustment strategy of the joint password is encrypting the joint password, then an encryption algorithm corresponding to the joint password is obtained according to a pre-stored encryption algorithm allocation strategy, the joint password is encrypted according to the encryption algorithm to obtain an encrypted joint password, and the encrypted joint password is outputted as the first processing password and/or the second processing password.

Way Two: if the content adjustment strategy of the joint password is adding a random number to the joint password, then the random number is obtained according to a preset random number generation strategy, a random number combination strategy corresponding to the joint password is obtained according to preset random number combination strategies, the joint password is processed according to the random number and the random number combination strategy to obtain a processed joint password, the processed joint password is output as the first processing password and/or the second processing password, and the random number and the random number combination strategy used for the first processing password and/or the second processing password are notified to the first terminal.

Way Three: if the content adjustment strategy of the joint password is adding a random number to the joint password and encrypting the joint password added with the random number, then the random number is obtained according to a preset random number generation strategy, a random number combination strategy corresponding to the joint password is obtained according to preset random number combination strategies, the joint password is processed according to the random number and the random number combination strategy to obtain a processed joint password, an encryption algorithm corresponding to the processed joint password is obtained according to a pre-stored encryption algorithm allocation strategy, the processed joint password is encrypted according to the encryption algorithm, the joint password processed by adding the random number and encrypting is outputted as the first processing password and/or the second processing password, and the random number and the random number combination strategy used for the first processing password and/or the second processing password are notified to the first terminal.

Way Four: if the content adjustment strategy of the joint password is encrypting the joint password and adding a random number to an encrypted joint password, then an encryption algorithm corresponding to the joint password is obtained according to a pre-stored encryption algorithm allocation strategy, the joint password is encrypted according to the encryption algorithm to obtain an encrypted joint password, the random number is obtained according to a preset random number generation strategy, a random number combination strategy corresponding to the encrypted joint password is obtained according to preset random number combination strategies, the encrypted joint password is processed according to the random number and the random number combination strategy, the joint password processed by encrypting and adding the random number is outputted as the first processing password and/or the second processing password, and the random number and the random number combination strategy used for the first processing password and/or the second processing password are notified to the first terminal.

The above four ways will be illustrated respectively as follows.

The difference between the first way and the conventional encryption algorithm is that, in the first way, the encryption algorithms used in each time may be different, thus increasing the randomness of the encryption algorithm, obtaining a better encryption effect and reducing a risk of breaking the encryption algorithm.

With the second way, the random number is added into the joint password, and thus a security of the signature message is improved since the cracker may not know the random number and the random number combination strategy corresponding to the joint password even if he breaks the joint password. In addition, the strategy used for adjusting the content of the joint password may be different each time, thus increasing a diversity of the content adjustment strategy, increasing a randomness of the content adjustment strategy, and reducing a risk of breaking the content adjustment strategy.

The third way and the fourth way are optimizations for the first way and the second way, which have a higher security compared with the first two ways.

For example, with the second way, if the joint password is 123456, the random number is 789 and the random number combination strategy is adding the random number to the last digit of the joint password, then the adjusted joint password is 123456789.

In order to ensure that the terminal may obtain the initial joint password when performing a subsequent verification, it is required to notify the terminal of the random number and the random number combination strategy used for adjusting the joint password.

Of course, there may be various random number combination strategies, such as adding one random number every one digit.

Of course, the joint password may also be adjusted as follows.

When a length of the joint password reaches a preset threshold, information at one or more digits of the joint password is deleted according to an obtained deleting strategy, and the joint password remained after performing the deleting operation is used as the adjusted joint password.

Alternatively, when the length of the joint password reaches the preset threshold, information at corresponding digits of the joint password is selected according to an obtained selection strategy for forming a new joint password, and the new joint password generated by combining is used as the adjusted joint password.

Alternatively, one calculation expression is obtained from calculation expressions pre-stored locally, the joint password is used as an input parameter of the calculation expression for calculating, and then a calculation result is used as the adjusted joint password.

Of course, with any of the above ways, it is required to notify the terminal of the strategy used in processing the joint password.

Due to the randomness of the random number itself, a randomness of information obtained by combining the joint password with the random number may be improved, and replay attacks may be prevented.

The strategy used for the first processing password may be identical with or different from the strategy used for the second processing password. Preferably, different strategies are used. This is because, since the cracker does not know the adjustment strategies used for each of the passwords, the other one of the passwords may not be cracked even if one of the passwords is cracked, thus improving a security of the passwords.

In step A06, the electronic signature token sends the first processing password together with the signature message to the first terminal.

In step A07, the first terminal receives the first processing password and the signature message, and notifies the first verification device to verify the signature message according to the first processing password and the operation request information.

It should be noted that, the first verification device may be a third-party device except the first terminal and the background system server, or may be a software module built in the first terminal or the background system server. The former may reduce processing burden of the first terminal and the background system server, and the latter may reduce a number of information interactions with external devices and have a high security and a low hardware cost.

The first terminal may notify the first verification device to verify the signature message according to the password to be verified and the operation request information in any one of following ways.

Way One: the first verification device is built in the first terminal, and the password to be verified and the signature message are verified by the verification device built in the first terminal respectively.

Way Two: the first verification device is built in the background system server, in which the terminal sends at least the password to be verified, the operation request information and the signature message to the verification device in the background system server and instructs the verification device in the background system server to verify the signature message according to the password to be verified and the operation request information.

One way may be selected from the above ways according to a processing performance of the terminal. For example, when the processing performance of the first terminal is better, the first way may be selected, and when the processing performance of the first terminal is limited or there are too many verification operations in the first terminal, the second way may be selected, thus giving consideration to the processing performance of the first terminal under the premise of completing the verification operation.

It can be seen that, by obtaining the current processing load of the terminal itself and controlling the verification according to the load, the terminal may be ensured giving consideration to the processing performance under the premise of completing the verification performance.

When the first verification device uses the second way to verify the signature message according to the password to be verified and the operation request information, the method may further include following operation.

The first terminal obtains the content adjustment strategy of the joint password from the electronic signature token, in which the joint password processed according to the content adjustment strategy of the joint password is the joint password used for generating the signature message, and/or the first terminal obtains the content adjustment strategy of the operation request information from the electronic signature token, in which the operation request information processed according to the content adjustment strategy of the operation request information is the operation request information used for generating the signature message.

Then, the first terminal sends the content adjustment strategy of the joint password and/or the content adjustment strategy of the operation request information to the first verification device.

A process of verifying the signature message by the first verification device is similar to a process of generating the signature message by the electronic signature token, which will be described specifically below.

If no content adjustment strategy is received, a message to be verified is directly generated according to the password to be verified and the operation request information, and then the message to be verified is compared with the signature message. If the message to be verified is identical with the signature message, the verification is successful, and if the message to be verified is different from the signature message, the verification fails.

If at least one of the content adjustment strategy of the joint password and the content adjustment strategy of the operation request information is received, then the password to be verified is adjusted according to the content adjustment strategy of the joint password, and/or the operation request information is adjusted according to the content adjustment strategy of the operation request information, such that a message to be verified is generated according to the adjusted information, and the message to be verified is used to verify the signature message.

For the latter, when the first verification device uses the second way to verify the signature message, and the first verification device has already negotiated about the content adjustment strategy with the electronic signature token and the first terminal in advance, then the first verification device may use the pre-negotiated content adjustment strategy to verify the signature message.

If the first verification device does not negotiate about the content adjustment strategy with the first terminal in advance, then the first terminal obtains the content adjustment strategy of the joint password and/or the content adjustment strategy of the operation request information from the electronic signature token, in which the joint password processed according to the content adjustment strategy of the joint password is the joint password used for generating the signature message, and the operation request information processed according to the content adjustment strategy of the operation request information is the operation request information used for generating the signature message, and then the first terminal sends the content adjustment strategy of the joint password and/or the content adjustment strategy of operation request information to the first verification device.

In step A08, the first verification device notifies the background system server to preprocess the operation request information if the signature message passes verification.

In step A09, the background system server preprocesses the operation request information according to the preset preprocessing strategy to obtain the preprocessed information.

Specifically, by preprocessing the operation request information, it may ensure that the user initiating the operation request information cannot deny, and meanwhile a certain security may be given to the other party interacting with the user.

For example, in the financial trading systems, after verifying the signature message successfully, the background system server freezes an amount of money corresponding to a payment amount of trading information in an account corresponding to the electronic signature token according to payment content in the operation request information. By freezing the payment, it may be ensured that the buyer cannot use the frozen money and the frozen money may be paid to the seller after confirming the trading, thus ensuring the security of the seller. The preprocessing herein may be freezing the payment directly by the bank, or transferring the payment amount of money to a third-party agency for a temporary storage.

In step A10, the electronic signature token outputs the prompt information about the joint password.

The prompt information about the joint password outputted by the electronic signature token may be the joint password displayed directly, or may be barcode information of the joint password, or may be sent out in a contactless way.

The prompt information may be "establishing a communication connection with the terminal", or "entering "XXXXXX" into the terminal", in which "XXXXXX" is the joint password, or "please scan the figure Y with the terminal", in which the figure Y is the barcode information.

Alternatively, in order to ensure that the joint password is outputted in a finite range and prevent others from reading the joint password, the electronic signature token may perform the following operations before outputting the joint password.

The electronic signature token verifies an identity of a requester requesting for outputting the joint password according to a preset identity verification strategy, and if the verification is successful, the electronic signature token outputs the joint password.

The identity may be verified by accessing password information of the smartcard, or by a special identity verification mechanism.

In step A11, the second terminal obtains the joint password according to the prompt information, and uses the joint password as the password to be verified.

Specifically, the first terminal is different from the second terminal, but each of the first terminal and the second terminal may be a POS machine, a mobile terminal, a tablet PC, a PC, etc. The second terminal may obtain the joint password in any of following ways. The second terminal may obtain the joint password by receiving information inputted via keys, for example, receiving the joint password inputted via the keyboard of the POS machine. Or, the second terminal may obtain the joint password by scanning information displayed on the smartcard, for example, scanning the barcode or the two-dimension code displayed on the smartcard by the POS machine. Or, the second terminal may obtain the joint password from the smartcard via a short distance wireless communication, for example, the smartcard may be placed in the communication range of the second terminal, and the joint password is obtained via NFC (Near Field Communication), etc.

Of course, when the user wishes a third party to collect the goods, the user may tell the joint password to the third party, such that the third party may confirm the trading.

It can be seen that, with the form of the joint password, the joint password can be transmitted in a form of plaintext, and account information of a user cannot be leaked out even if the joint password is transmitted in the form of plaintext, thus ensuring a security of the account information of the user and improving a security of the trading.

Since an order operation of the online trading and a confirmation operation confirming the trading when receiving the goods may be completed in two different terminals, the security of the buyer, the seller and the funds can be ensured.

In step A12, the second terminal notifies the second verification device to verify the password to be verified.

Similarly, the second verification device may be a third-party device except the second terminal and the background system server, or may be a software module built in the second terminal or the background system server. The former may reduce processing burden of the second terminal and the background system server, and the latter may reduce a number of information interactions with external devices, thus having a high security and a low hardware cost.

In step A13, the second verification device triggers the background system server to perform a response process of the operation request information according to the preprocessed information if the password to be verified passes verification.

In simple terms, the pending operation request information will be implemented to complete. For example, the payment is unfrozen and the trading is performed, in which the background system server verifies whether the joint password from the second terminal is consistent with the information related to joint password from the first terminal, so as to ensure the authenticity of the buyer's identity.

In order to facilitate those skilled in the art to understand the content of the present disclosure more clearly, a specific scenario is taken to illustrate.

In the scenario, the background system server may be a bank background system server or a third-party server, and the third-party server is a non-bank system server, such as a server for storing money temporarily in an online trading system, for example a server for storing money temporarily in an Alipay system corresponding to Taobao. The terminal may be a PC or a mobile terminal.

The smartcard having the signature function accesses to the first terminal and receives the trading information.

The smartcard generates the joint password and generates an encrypted joint password according to at least the joint password.

The smartcard generates the signature message according to the trading information and the encrypted joint password.

The smartcard sends the signature message and the encrypted joint password to the first terminal.

The first terminal sends at least the trading information, the signature message and the encrypted joint password to the background system server.

The background system server verifies the signature message and freezes the payment according to the trading information or sends the payment corresponding to the trading information to the third-party server if the signature message passes the verification.

When the trading is confirmed, the smartcard displays the joint password, and the second terminal obtains the joint password and sends the joint password to the background system server.

The background system server verifies the joint password, and unfreezes the payment and performs the trading if the joint password passes the verification. Or, the background system server verifies the joint password, and sends the trading instruction to the third-party server for performing the trading by the third-party server if the joint password passes the verification.

According to the application provided by the present disclosure, the joint password can be obtained by the second terminal for completing the trading, such that the joint password can be transmitted in a form of plaintext and account information of a user cannot be leaked out even if the joint password is transmitted in the form of plaintext, thus ensuring a security of the account information of the user and improving a security of the trading. Moreover, by performing a signature on the trading message and the joint password, a non-repudiation of the trading is ensured and the security of the trading is improved. In addition, by freezing the payment, it is ensured that the buyer cannot use the frozen payment and the frozen payment may be paid to the seller when the trading is confirmed, thus ensuring the security of the seller. Meanwhile, the frozen payment may be paid to the seller only when the correct joint password is input by the buyer for confirming the trading, thus ensuring the security of the funds of the buyer. Further, the goods is not provided to the buyer when the buyer inputs the wrong password for confirming the online trading, thus ensuring the security of the seller. Therefore, with the present disclosure, the order operation of the online trading and the confirmation operation confirming the trading when receiving the goods may be completed in two different terminals, thus ensuring a security of the online trading.

Figure 2:
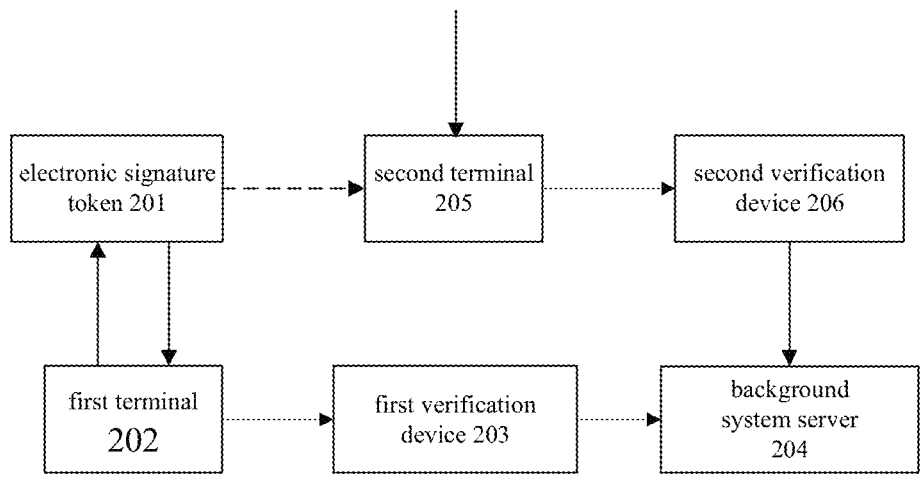
FIG. 2 is a block diagram of an information processing system according to an embodiment of the present disclosure.

FIG. 2 is a block diagram of a information processing system according to an embodiment of the present disclosure. The system shown in FIG. 2 includes an electronic signature token 201, a first terminal 202, a first verification device 203, a background system server 204, a second terminal 205 and a second verification device 206.

A first sending module in the first terminal 202 is configured to send operation request information to the electronic signature token 201 after detecting an operation request.

A storage module in the electronic signature token 201 is configured to store the operation request information after receiving the operation request information output from the first terminal 201.

A first generating module in the electronic signature token 201 is connected with the storage module and is configured to generate a joint password according to a password generation strategy pre-stored locally.

A second generating module in the electronic signature token 201 is connected with the first generating module and is configured to generate a signature message according to the operation request information and the joint password after obtaining the joint password.

An adjusting module in the electronic signature token 201 is connected with the first generating module and is configured to adjust a content of the joint password according to a pre-stored joint password adjustment strategy to obtain an adjusted joint password, and to use the adjusted joint password as a first processing password.

A second sending module in the electronic signature token 201 is connected with the second generating module and the adjusting module respectively and is configured to send the first processing password together with the signature message to the first terminal 202.

A first notifying module in the first terminal 202 is connected with the second sending module and is configured to notify the first verification device 203 to verify the signature message according to the first processing password and the operation request information after receiving the first processing password and the signature message.

A second notifying module in the first verification device 203 is connected with the first notifying module and is configured to notify the background system server 204 to preprocess the operation request information if the signature message passes verification.

A preprocessing module in the background system server 204 is connected with the second notifying module and is configured to preprocess the operation request information according to a preset preprocessing strategy to obtain preprocessed information.

An outputting module in the electronic signature token 201 is configured to output prompt information of the joint password.

An obtaining module in the second terminal 205 is configured to obtain the joint password according to the prompt information and to use the joint password as a password to be verified.

A third notifying module in the second terminal 205 is connected with the obtaining module and is configured to notify the second verification device to verify the password to be verified.

A triggering module in the second verification device 206 is connected with the third notifying module and is configured to trigger the background system server 204 to perform a response process of the operation request information according to the preprocessed information if the password to be verified passes verification.

The second generating module includes a generating sub-module and at least one of a first processing sub-module and a second processing sub-module, in which the first processing sub-module includes a first obtaining unit and a first processing unit, the second processing sub-module includes a second obtaining unit and a second processing unit.

The first obtaining unit is configured to obtain a content adjustment strategy of the operation request information.

The first processing unit is configured to process a content of the operation request information according to the content adjustment strategy of the operation request information to obtain adjusted operation request information.

The second obtaining unit is configured to obtain a content adjustment strategy of the joint password.

The second processing unit is configured to adjust the content of the joint password according to the content adjustment strategy of the joint password to obtain an adjusted joint password, and to use the adjusted joint password as a second processing password.

The generating sub-module is configured to obtain the signature message by signing any one of the following combinations:

the adjusted operation request information and the joint password;

the operation request information and the second processing password;

the adjusted operation request information and the second processing password.

The second generating module further includes a notifying sub-module.

The notifying sub-module is configured to notify the first terminal 202 of the content adjustment strategy used for adjusting the operation request information; or notify the first terminal 202 of the content adjustment strategy used for the second processing password; or notify the first terminal 202 of the content adjustment strategy used for adjusting the operation request information and the content adjustment strategy used for the second processing password.

The first terminal 202 further includes a fourth notifying module.

The fourth notifying module is connected with the first notifying module, and is configured to notify the first verification device 203 of the content adjustment strategy used for adjusting the operation request information; or notify the first verification device 203 of the content adjustment strategy used for the second processing password; or notify the first verification device 203 of the content adjustment strategy used for adjusting the operation request information and the content adjustment strategy used for the second processing password.

If the content adjustment strategy of the operation request information is encrypting the operation request information, the first processing sub-module is configured to obtain an encryption algorithm corresponding to the operation request information according to a pre-stored encryption algorithm allocation strategy, to encrypt the operation request information according to the encryption algorithm to obtain an encrypted operation request information, and to use the encrypted operation request information as the adjusted operation request information.

The adjusting module is configured to obtain the first processing password and/or the second processing sub-module is configured to obtain the second processing password in any of following ways.

If the content adjustment strategy of the joint password is encrypting the joint password, then the adjusting module obtains an encryption algorithm corresponding to the joint password according to a pre-stored encryption algorithm allocation strategy, encrypts the joint password according to the encryption algorithm to obtain an encrypted joint password, and outputs the encrypted joint password as the first processing password and/or the second processing password.

If the content adjustment strategy of the joint password is adding a random number to the joint password, then the adjusting module obtains the random number according to a preset random number generation strategy, obtains a random number combination strategy corresponding to the joint password according to preset random number combination strategies, processes the joint password according to the random number and the random number combination strategy to obtain a processed joint password, outputs the processed joint password as the first processing password and/or the second processing password, and notifies the first terminal of the random number and the random number combination strategy used for the first processing password and/or the second processing password.

If the content adjustment strategy of the joint password is adding a random number to the joint password and encrypting the joint password added with the random number, then the adjusting module obtains the random number according to a preset random number generation strategy, obtains a random number combination strategy corresponding to the joint password according to preset random number combination strategies, processes the joint password according to the random number and the random number combination strategy to obtain a processed joint password, obtains an encryption algorithm corresponding to the processed joint password according to a pre-stored encryption algorithm allocation strategy, encrypts the processed joint password according to the encryption algorithm, outputs the joint password processed by adding the random number and encrypting as the first processing password and/or the second processing password, and notifies the first terminal the random number and the random number combination strategy used for the first processing password and/or the second processing password.

If the content adjustment strategy of the joint password is encrypting the joint password and adding a random number to an encrypted joint password, then the adjusting module obtains an encryption algorithm corresponding to the joint password according to a pre-stored encryption algorithm allocation strategy, encrypts the joint password according to the encryption algorithm to obtain an encrypted joint password, obtains the random number according to a preset random number generation strategy, obtains a random number combination strategy corresponding to the encrypted joint password according to preset random number combination strategies, processes the encrypted joint password according to the random number and the random number combination strategy, outputs the joint password processed by encrypting and adding the random number as the first processing password and/or the second processing password, and notifies the first terminal the random number and the random number combination strategy used for the first processing password and/or the second processing password.

The outputting module includes a verification unit and an outputting unit.

The verification unit is configured to verify an identity of a requester requesting for outputting the joint password according to a preset identity verification strategy.

The outputting unit is configured to output the joint password if the verification is successful.

The password to be verified is obtained by the obtaining module in any one of following ways.

The obtaining module detects information input via an input device of the second terminal, and obtains the password to be verified according to a detection result.

The obtaining module scans barcode information or graphic information of the joint password displayed on a display screen of the electronic signature token, so as to obtain the password to be verified.

The obtaining module establishes a contactless communication connection with the electronic signature token, and receives the joint password sent by the electronic signature token via the contactless communication connection, in which the received joint password is used as the password to be verified.

The first verification device 203 is built in the first terminal 202 or the background system server 204, and/or the second verification device 206 is built in the second terminal 205 or the background system server 204.

The electronic signature token 201 is a smartcard or any other electronic signature token having a signature function.

Compared with the related art, according to the information processing system provided by the present disclosure, the joint password is obtained by the second terminal for completing a trading, such that the joint password can be transmitted in a form of plaintext, and account information of a user cannot be leaked out even if the joint password is transmitted in the form of plaintext, thus ensuring a security of the account information of the user and improving a security of the trading. Moreover, by performing a signature on the operation request information and the joint password, a non-repudiation of the trading is ensured and the security of the trading is improved.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An information processing method, comprising:
   detecting, by a first terminal, an operation request, and sending, by the first terminal, operation request information to an electronic signature token;
   receiving, by the electronic signature token, the operation request information output from the first terminal, storing, by the electronic signature token, the operation request information, generating, by the electronic signature token, a joint password according to a password generation strategy pre-stored locally, generating, by the electronic signature token, a signature message according to the operation request information and the joint password, adjusting, by the electronic signature token, a content of the joint password according to a pre-stored joint password adjustment strategy to obtain an adjusted joint password, using, by the electronic signature token, the adjusted joint password as a first processing password, and sending, by the electronic signature token, the first processing password and the signature message to the first terminal;
   receiving, by the first terminal, the first processing password and the signature message, notifying a first verification device, by the first terminal, to verify the signature message according to the first processing password and the operation request information;
   notifying a background system server computer, by the first verification device, to preprocess the operation request information if the signature message passes verification;
   preprocessing, by the background system server computer, the operation request information according to a preset preprocessing strategy to obtain preprocessed information;
   outputting, by the electronic signature token, prompt information about the joint password;
   obtaining, by a second terminal, the joint password according to the prompt information, and
   using, by the second terminal, the joint password as a password to be verified;

notifying a second verification device, by the second terminal, to verify the password to be verified;
triggering the background system server computer, by the second verification device, to perform a response process of the operation request information according to the preprocessed information if the password to be verified passes verification.

2. The method according to claim 1, wherein generating, by the electronic signature token, a signature message according to the operation request information and the joint password comprises:
obtaining, by the electronic signature token, a content adjustment strategy of the operation request information, and processing, by the electronic signature token, a content of the operation request information according to the content adjustment strategy of the operation request information to obtain adjusted operation request information; and/or obtaining, by the electronic signature token, a content adjustment strategy of the joint password, adjusting, by the electronic signature token, the content of the joint password according to the content adjustment strategy of the joint password to obtain an adjusted joint password, and using the adjusted joint password as a second processing password;
obtaining the signature message by signing any one of following combinations:
the adjusted operation request information and the joint password;
the operation request information and the second processing password;
the adjusted operation request information and the second processing password.

3. The method according to claim 2, further comprising:
notifying the first terminal the content adjustment strategy used for adjusting the operation request information; or
notifying the first terminal the content adjustment strategy used for the second processing password; or
notifying the first terminal the content adjustment strategy used for adjusting the operation request information and the content adjustment strategy used for the second processing password.

4. The method according to claim 2, wherein notifying a first verification device, by the first terminal, to verify the signature message according to the first processing password and the operation request information further comprises:
notifying the first verification device, by the first terminal, the content adjustment strategy used for adjusting the operation request information; or
notifying the first verification device by the first terminal, the content adjustment strategy used for the second processing password; or
notifying the first verification device by the first terminal, the content adjustment strategy used for adjusting the operation request information and the content adjustment strategy used for the second processing password.

5. The method according to claim 2, wherein processing a content of the operation request information according to the content adjustment strategy of the operation request information to obtain adjusted operation request information comprises:
if the content adjustment strategy of the operation request information is encrypting the operation request information, then obtaining an encryption algorithm corresponding to the operation request information according to a pre-stored encryption algorithm allocation strategy, encrypting the operation request information according to the encryption algorithm to obtain an encrypted operation request information, and using the encrypted operation request information as the adjusted operation request information.

6. The method according to claim 2, wherein the first processing password and/or the second processing password are obtained by any of following ways:
if the content adjustment strategy of the joint password is encrypting the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the first processing password and/or the second processing password;
if the content adjustment strategy of the joint password is adding a random number to the joint password, then obtaining the random number according to a preset random number generation strategy, obtaining a random number combination strategy corresponding to the joint password according to preset random number combination strategies, processing the joint password according to the random number and the random number combination strategy to obtain a processed joint password, outputting the processed joint password as the first processing password and/or the second processing password, and notifying the first terminal the random number and the random number combination strategy used for the first processing password and/or the second processing password;
if the content adjustment strategy of the joint password is adding a random number to the joint password and encrypting the joint password added with the random number, then obtaining the random number according to a preset random number generation strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm, outputting the joint password processed by adding the random number and encrypting as the first processing password and/or the second processing password, and notifying the first terminal the random number and the random number combination strategy used for the first processing password and/or the second processing password;
if the content adjustment strategy of the joint password is encrypting the joint password and adding a random number to an encrypted joint password, then obtaining an encryption algorithm corresponding to the joint password according to a pre-stored encryption algorithm allocation strategy, encrypting the joint password according to the encryption algorithm to obtain an encrypted joint password, obtaining the random number according to a preset random number generation strategy, obtaining a random number combination strategy corresponding to the encrypted joint password according to preset random number combination strategies, processing the encrypted joint password according to the random number and the random number combination strategy, outputting the joint password processed by encrypting and adding the random number as the first processing password and/or the second processing password, and notifying the first terminal the random number and the random number combination strategy used for the first processing password and/or the second processing password.

7. The method according to claim 1, before outputting by the electronic signature token prompt information about the joint password, further comprising:
    verifying an identity of a requester requesting for outputting the joint password according to a preset identity verification strategy;
    outputting the joint password if the verification is successful.

8. The method according to claim 1, wherein the password to be verified is obtained in any of following ways:
    detecting information input via an input device of the second terminal, and obtaining the password to be verified according to a detection result;
    scanning barcode information or graphic information of the joint password displayed on a display screen of the electronic signature token to obtain the password to be verified;
    establishing a contactless communication connection with the electronic signature token, receiving the joint password sent by the electronic signature token via the contactless communication connection, in which the joint password received is used as the password to be verified.

9. An information processing system, comprising:
    a first terminal, including a first sending software module and a first notifying software module;
    an electronic signature token, including a storage module, a first generating software module, a second generating software module, an adjusting software module, a second sending software module and an outputting module;
    a first verification device, including a second notifying software module;
    a background system server computer, including a preprocessing software module;
    a second terminal, including an obtaining software module and a third notifying software module; and
    a second verification device, including a triggering module;
    wherein the first sending software module is configured to send operation request information to the electronic signature token after detecting an operation request;
    wherein the storage module is configured to store the operation request information after receiving the operation request information output from the first terminal;
    wherein the first generating software module is connected with the storage module and configured to generate a joint password according to a password generation strategy pre-stored locally;
    wherein the second generating software module is connected with the first generating software module and configured to generate a signature message according to the operation request information and the joint password after obtaining the joint password;
    wherein the adjusting software module is connected with the first generating software module and configured to adjust a content of the joint password according to a pre-stored joint password adjustment strategy to obtain an adjusted joint password, and to use the adjusted joint password as a first processing password;
    wherein the second sending software module is connected with the second generating software module and the adjusting software module respectively and configured to send the first processing password together with the signature message to the first terminal;
    wherein the first notifying software module is connected with the second sending software module and configured to notify the first verification device to verify the signature message according to the first processing password and the operation request information after receiving the first processing password and the signature message;
    wherein the second notifying software module is connected with the first notifying software module and configured to notify the background system server computer to preprocess the operation request information if the signature message passes verification;
    wherein the preprocessing software module is connected with the second notifying software module and configured to preprocess the operation request information according to a preset preprocessing strategy to obtain preprocessed information;
    wherein the outputting module is configured to output prompt information of the joint password;
    wherein the obtaining software module is configured to obtain the joint password according to the prompt information and to use the joint password as a password to be verified;
    wherein the third notifying software module is connected with the obtaining software module and configured to notify the second verification device to verify the password to be verified;
    wherein the triggering software module is connected with the third notifying software module and configured to trigger the background system server computer to perform a response process of the operation request information according to the preprocessed information if the password to be verified passes verification.

10. The system according to claim 9, wherein the second generating software module comprises a generating software sub-module and at least one of a first processing software sub-module and a second processing software sub-module, wherein the first processing software sub-module comprises:
    a first obtaining software unit, configured to obtain a content adjustment strategy of the operation request information;
    a first processing unit, configured to process a content of the operation request information according to the content adjustment strategy of the operation request information to obtain adjusted operation request information;
    the second software processing sub-module comprises:
    a second obtaining software unit, configured to obtain a content adjustment strategy of the joint password;
    a second processing unit, configured to adjust the content of the joint password according to the content adjustment strategy of the joint password to obtain an adjusted joint password, and to use the adjusted joint password as a second processing password;
    the generating software sub-module is configured to obtain the signature message by signing any one of following combinations:
    the adjusted operation request information and the joint password;
    the operation request information and the second processing password;
    the adjusted operation request information and the second processing password.

11. The system according to claim 10, wherein the second generating software module further comprises:
  a notifying software sub-module, configured to notify the first terminal the content adjustment strategy used for adjusting the operation request information; or notify the first terminal the content adjustment strategy used for the second processing password; or notify the first terminal the content adjustment strategy used for adjusting the operation request information and the content adjustment strategy used for the second processing password.

12. The system according to claim 10, wherein the first terminal further comprises:
  a fourth notifying software module, connected with the first notifying software module, and configured to notify the first verification device the content adjustment strategy used for adjusting the operation request information; or notify the first verification device the content adjustment strategy used for the second processing password; or notify the first verification device the content adjustment strategy used for adjusting the operation request information and the content adjustment strategy used for the second processing password.

13. The system according to claim 10, wherein the first processing software sub-module is configured to obtain an encryption algorithm corresponding to the operation request information according to a pre-stored encryption algorithm allocation strategy, to encrypt the operation request information according to the encryption algorithm to obtain an encrypted operation request information, and to use the encrypted operation request information as the adjusted operation request information, if the content adjustment strategy of the operation request information is encrypting the operation request information.

14. The system according to claim 10, wherein the adjusting software module is configured to obtain the first processing password and/or the second processing software sub-module is configured to obtain the second processing password in any of following ways:
  if the content adjustment strategy of the joint password is encrypting the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the first processing password and/or the second processing password;
  if the content adjustment strategy of the joint password is adding a random number to the joint password, then obtaining a random number according to a preset random number generation strategy, obtaining the random number combination strategy corresponding to the joint password according to preset random number combination strategies, processing the joint password according to the random number and the random number combination strategy to obtain a processed joint password, outputting the processed joint password as the first processing password and/or the second processing password, and notifying the first terminal the random number and the random number combination strategy used for the first processing password and/or the second processing password;
  if the content adjustment strategy of the joint password is adding a random number to the joint password and encrypting the joint password added with the random number, then obtaining the random number according to a preset random number generation strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm, outputting the joint password processed by adding the random number and encrypting as the first processing password and/or the second processing password, and notifying the first terminal the random number and the random number combination strategy used for the first processing password and/or the second processing password;
  if the content adjustment strategy of the joint password is encrypting the joint password and adding a random number to an encrypted joint password, then obtaining an encryption algorithm corresponding to the joint password according to a pre-stored encryption algorithm allocation strategy, encrypting the joint password according to the encryption algorithm to obtain an encrypted joint password, obtaining the random number according to a preset random number generation strategy, obtaining a random number combination strategy corresponding to the encrypted joint password according to preset random number combination strategies, processing the encrypted joint password according to the random number and the random number combination strategy, outputting the joint password processed by encrypting and adding the random number as the first processing password and/or the second processing password, and notifying the first terminal the random number and the random number combination strategy used for the first processing password and/or the second processing password.

15. The system according to claim 9, wherein the outputting module comprises:
  a verification software unit, configured to verify an identity of a requester requesting for outputting the joint password according to a preset identity verification strategy;
  an outputting software unit, configured to output the joint password if the verification is successful.

16. The system according to claim 9, wherein the obtaining software module is configured to obtain the password to be verified by any one of following ways:
  detecting information input via an input device of the second terminal, and obtaining the password to be verified according to a detection result;
  scanning barcode information or graphic information of the joint password displayed on a display screen of the electronic signature token to obtain the password to be verified;
  establishing a contactless communication connection with the electronic signature token, receiving the joint password sent by the electronic signature token via the contactless communication connection in which the joint password received is used as the password to be verified.

17. The system according to claim 9, wherein the first verification device is built into the first terminal or the background system computer server, and/or the second verification device is built into the second terminal or the background system server computer.

18. The system according to claim 9, wherein the electronic signature token is a smartcard or an electronic signature token having a signature function.

19. The method according to claim 3, wherein notifying a first verification device, by the first terminal, to verify the signature message according to the first processing password and the operation request information further comprises:
- notifying the first verification device, by the first terminal, the content adjustment strategy used for adjusting the operation request information; or
- notifying the first verification device, by the first terminal, the content adjustment strategy used for the second processing password; or
- notifying the first verification device, by the first terminal, the content adjustment strategy used for adjusting the operation request information and the content adjustment strategy used for the second processing password.

20. The method according to claim 3, wherein processing a content of the operation request information according to the content adjustment strategy of the operation request information to obtain adjusted operation request information comprises:
- if the content adjustment strategy of the operation request information is encrypting the operation request information, then obtaining an encryption algorithm corresponding to the operation request information according to a pre-stored encryption algorithm allocation strategy, encrypting the operation request information according to the encryption algorithm to obtain an encrypted operation request information, and using the encrypted operation request information as the adjusted operation request information.

* * * * *